(12) United States Patent
Dumont

(10) Patent No.: US 7,401,437 B2
(45) Date of Patent: Jul. 22, 2008

(54) ROTARY PLANT GROWING APPARATUS

(76) Inventor: Gilles Dumont, 47, rue Bienvenue, St-Constant, Quebec (CA) J5A 1X5

( * ) Notice: Subject to any disclaimer, the term of this patent is extended or adjusted under 35 U.S.C. 154(b) by 15 days.

(21) Appl. No.: 10/797,806

(22) Filed: Mar. 10, 2004

(65) Prior Publication Data

US 2005/0055878 A1     Mar. 17, 2005

(30) Foreign Application Priority Data

Mar. 10, 2003    (CA) .................................. 2421389
Jun. 9, 2003    (CA) .................................. 2431523

(51) Int. Cl.
*A01G 31/06*    (2006.01)
*A01G 31/02*    (2006.01)

(52) U.S. Cl. ................... 47/62 R; 47/62 C; 47/59 R

(58) Field of Classification Search ............... 47/82, 47/83, 65.5, 59 R, 60, 62 R, 62 A, 62 C, 62 E, 47/62 H
See application file for complete search history.

(56) References Cited

U.S. PATENT DOCUMENTS

| | | | | |
|---|---|---|---|---|
| 3,909,978 A | * | 10/1975 | Fleming | ............... 47/82 |
| 4,085,544 A | * | 4/1978 | Blake | ............... 47/39 |
| 5,228,229 A | * | 7/1993 | Lindgren | ............... 47/39 |
| 5,996,277 A | * | 12/1999 | Loeb | ............... 47/1.01 R |
| 6,604,321 B2 | * | 8/2003 | Marchildon | ............... 47/62 R |
| 2005/0039396 A1 | * | 2/2005 | Marchildon | ............... 47/62 E |
| 2006/0196118 A1 | * | 9/2006 | Brusatore | ............... 47/83 |

FOREIGN PATENT DOCUMENTS

| | | | |
|---|---|---|---|
| CA | 2396317 | * | 11/2002 |
| DE | 1582741 | * | 6/1977 |
| DE | 2639088 A1 | * | 3/1978 |
| DE | 10013737 A1 | * | 10/2001 |
| EP | 0220348 A1 | * | 5/1987 |
| EP | 0233663 | * | 8/1987 |
| FR | 2680074 A1 | * | 2/1993 |
| JP | 2-283221 | * | 11/1990 |
| JP | 4-311324 | * | 11/1992 |
| JP | 2004-97012 | * | 4/2004 |
| SU | 1519595 A | * | 11/1989 |
| WO | WO 02/063945 A1 | * | 8/2002 |

* cited by examiner

*Primary Examiner*—T. Nguyen
(74) *Attorney, Agent, or Firm*—Eric Fincham

(57) ABSTRACT

A rotary growing apparatus which utilises a single ring mounted on a support, the ring being rotatably driven above the rotational axis thereof, and having a plurality of medium retaining members extending transversely of the ring, each medium retaining member being secured to the ring, and at least one light source interiorly of the ring. The preferred arrangement includes the ring being formed of a plurality of ring segments such that the size may be varied thereby adjust the distance between the light source and the plants.

11 Claims, 8 Drawing Sheets

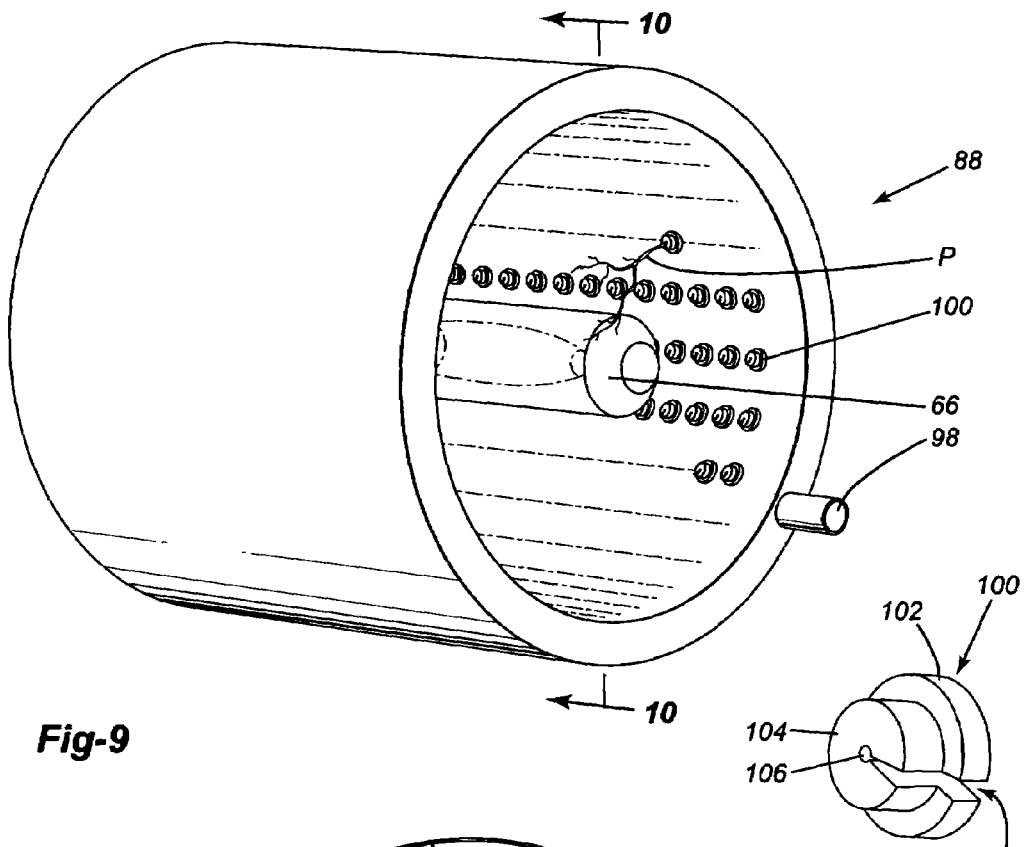
Fig-9
Fig-11
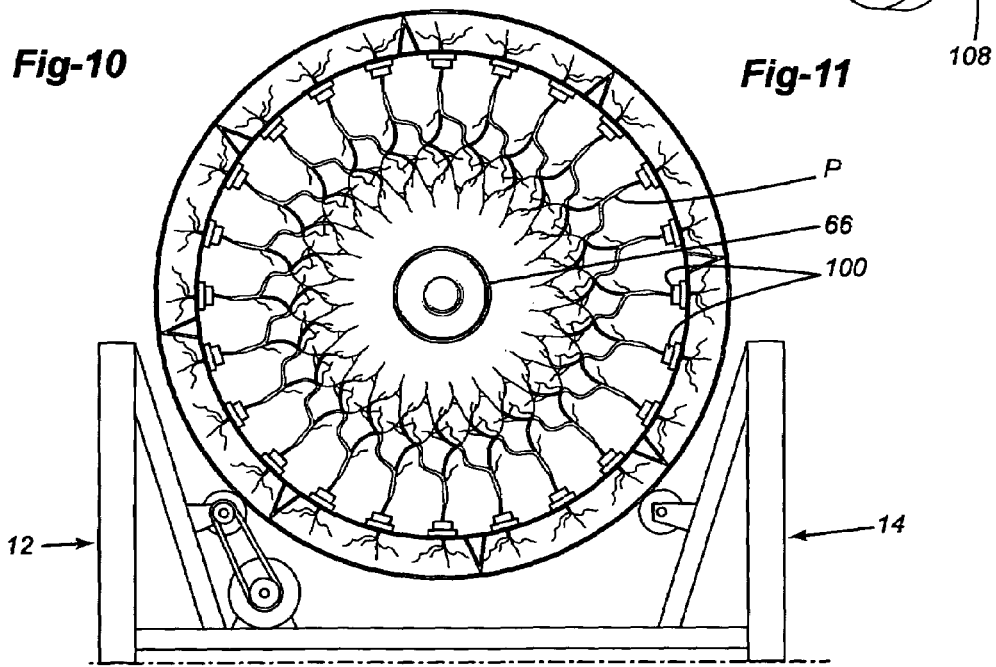
Fig-10

ROTARY PLANT GROWING APPARATUS

FIELD OF THE INVENTION

The present invention relates to a plant growing apparatus of the type wherein a cylindrical drum like structure rotates about a light source.

BACKGROUND OF THE INVENTION

The field of growing plants using lamps is well know in the art and many systems have been proposed. Thus, it is extremely popular to use hydroponics to grow different types of plants. Generally, in such a growth system, a non-soil medium is utilised and the plant gathers the nutrients from a liquid to which the roots are exposed. There are many known types of hydroponic systems which need not be discussed in great detail herein.

One problem with hydroponic systems is that they consume a large area for a given yield. Generally, the plants grow from containers which usually lie in a horizontal plane and lights are suspended from above the plants and containers. A substantial amount of energy is required for these lights and accordingly, the use of hydroponics is relatively expensive in most situations. It will be understood that when natural light can be employed, the cost is naturally somewhat less although this implies the use of more energy for heating.

In order to overcome this problem, it has recently been proposed in the art to utilise a drum wherein the drum carries the non-soil medium in which the plant grows, and the drum rotates about a light source hereby maintaining a substantially constant distance between the plants and the light. The drum is rotated and there is provided a trough located at the bottom of the drum into which the plants or at least the root system, are immersed to thereby provide the required moisture and nutrients. One such arrangement is shown in published Canadian Patent Application 2,343,254 wherein the plants are placed in a pot and held by the rotating drum.

The advantage of such a system is that substantially less real estate is required for a given yield and a single light source can more efficiently serve to provide the desired light. As the given amount of light decreases exponentially with the distance between the light and the plants, such an arrangement becomes very efficient. However, one of the problems encountered with such an arrangement has been the relatively complex mechanical features and the problem of maintenance of the area. Thus, after the plants are immersed in the water, there tends to be a certain amount of dripping and a collector system must be provided in order to maintain a neat appearance.

Also, a problem which has been encountered in the prior art rotating drum systems is the maintenance of the correct light intensity. As aforementioned, the light intensity is an exponentially related to the distance between the plant and the light. As there must be sufficient room for the plants to grow, the light source must be a certain distance away from the plants. While this distance may be suitable when the plants are substantially full grown, the light intensity may be insufficient for the plants when they are very young.

SUMMARY OF THE INVENTION

Accordingly, it is an object of the present invention to provide a novel plant growing apparatus of the rotating drum type wherein the distance between the light and the plants may be varied.

It is a further object of the present invention to provide a unique feeding system for the plants in a rotary drum plant growing system wherein the problem of dripping is substantially obviated.

It is a further object of the present invention to provide a relatively simple, but yet reliable, plant growing apparatus of the rotary drum type.

In a greater detail, the plant growing apparatus of the present invention, and in one of the embodiments thereof, utilises a single ring which is made up of a plurality of ring segments. Utilising a single ring simplifies the structure of the apparatus in that problems of alignment utilising dual rings such as shown in Canadian Patent Application 2,343,254 can occur. Utilising a single ring mounted centrally of the apparatus simplifies operation of the same.

Preferably, the single ring is formed of a plurality of ring segments. This provides advantages in that the apparatus can be broken down into component parts and thus more easily transported. Also, the use of a single ring centrally located, and formed of a plurality of ring segments, can permit the variation of the ring diameter.

Thus, the ring segments are joined together to form the overall ring. However, according to one embodiment of the present invention, there are provided means for joining the rings such that the diameter of the ring can be varied. In one embodiment, this may be achieved by utilising a slot to receive a fastening member. Thus, one may have a plurality of apertures at the ends of each ring segment and mechanical fastening means can be employed. Such mechanical fastening means may include nuts and bolts although one or both of the ring segments may include pins which extend outwardly and engage the other ring segment. The use of the slot permits the angle of attachment of one ring segment with respect to an adjacent ring segment to be varied. In a preferred embodiment, the number of ring segments employed to complete a full size circular ring would be eight while one or two of the segments could be removed to thereby diminish the diameter of the structure.

The provision of a variable diameter ring permits the distance between the plants and the light source (which is centrally located) to be varied. As is previously being mentioned, the distance between the plants and the light source is very important as the intensity of the light received by the plant varies exponentially according to the distance between the plant and light source.

The light source itself may be conventional and many such light sources are known in the art and are commercially available. Thus, high intensity growing lamps or fluorescent light could be employed.

In one preferred embodiment of the present invention, there is provided a liquid feeding means wherein the liquid is fed to the plants and plant growing medium through the back of the plant medium retaining members. In so doing, problems encountered with the prior art structures of dripping and the like are obviated.

Any conventional type of pump may be provided and which is suitably connected via hoses and a distribution plenum to a plurality of individual feeders, each individual feeder being arranged to feed the liquid through a slot formed in the medium retaining member. With such an arrangement, the precise amount of liquid and/or nutrient fed to each slot can be controlled.

The initiation of the liquid feeding process may be provided through sensors which detect when the medium retaining member is in position. Such sensors may be electronic or mechanical. For example, there may be provided a sensor which is activated when the medium retaining member is in the desired position.

In a further embodiment of the present invention, the means for feeding the liquid to the medium retaining member and the plants is one in which an ultrasonic fog generator is utilised to produce droplets which are generally less than five microns in diameter. These small fog particles can be fed to the root system of the plant. It is theorized that these particles are sized such that they can be absorbed directly by the plant.

Naturally, any nutrients carried thereby likewise would be absorbed. The advantage of such a system would include the saving of water and elimination of certain root diseases.

BRIEF DESCRIPTION OF THE DRAWINGS

Having thus generally described the invention, reference will be made to the accompanying drawings illustrating embodiments thereof, in which:

FIG. 9 is a perspective view of the drum of the embodiment of FIG. 7 showing plant growth;

FIG. 10 is a side elevational view thereof;

FIG. 11 is a perspective view of an individual plant retaining member;

DESCRIPTION OF THE PREFERRED EMBODIMENTS

Figure 1:
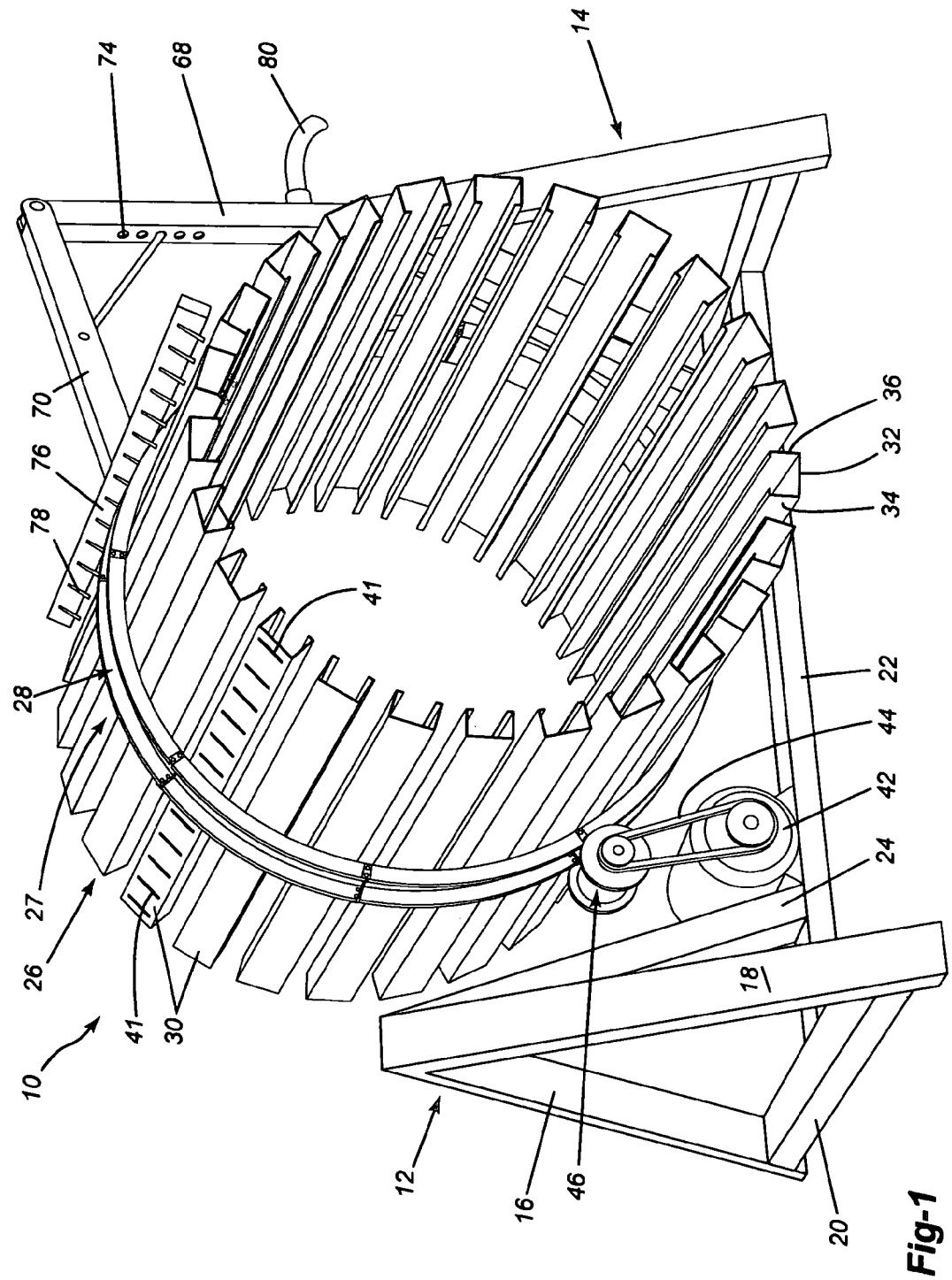
FIG. 1 is a perspective view a first embodiment of a rotary plant growing apparatus according to the present invention.

Referring to the drawings in a greater detail and by reference characters thereto, there is illustrated in FIG. 1 a first embodiment of a plant growing apparatus generally designated by reference numeral 10.

Plant growing apparatus 10 includes a first frame assembly generally designated by reference numeral 12 and a second frame assembly generally designated by reference numeral 14. Each of frame assemblies 12 and 14 are substantially similar and thus only one will be described in detail herein.

First frame assembly 12 is of a generally triangular configuration and includes a first leg 16 and a second leg 18 which extend upwardly from a horizontal frame element 20 and which are suitably secured together. Extending between first frame assembly 12 and second frame assembly 14 is longitudinally extending frame element 22. A reinforcing frame element 24 extends between longitudinally frame element 22 and the top of legs 16 and 18.

Mounted between first frame assembly 12 and second frame assembly 14 is a rotating assembly which is generally designated by reference numeral 26. Rotating assembly 26 includes a ring 27 which is comprised of a plurality of substantially identical ring segments 28. Mounted transversely of ring 27 are a plurality of medium retaining members 30. Each medium retaining member 30 comprises a base 32 and a pair of side walls 34 and 36 which in turn terminate inwardly extending the flanges 38 and 40 respectively. Provided in base 32 are a plurality of slots 41 for reasons which will become apparent hereinbelow.

Ring 27 is rotatably driven by means of a motor 42 which is operatively connected to a drive mechanism 46 by means of drive belt 44.

Figure 4:
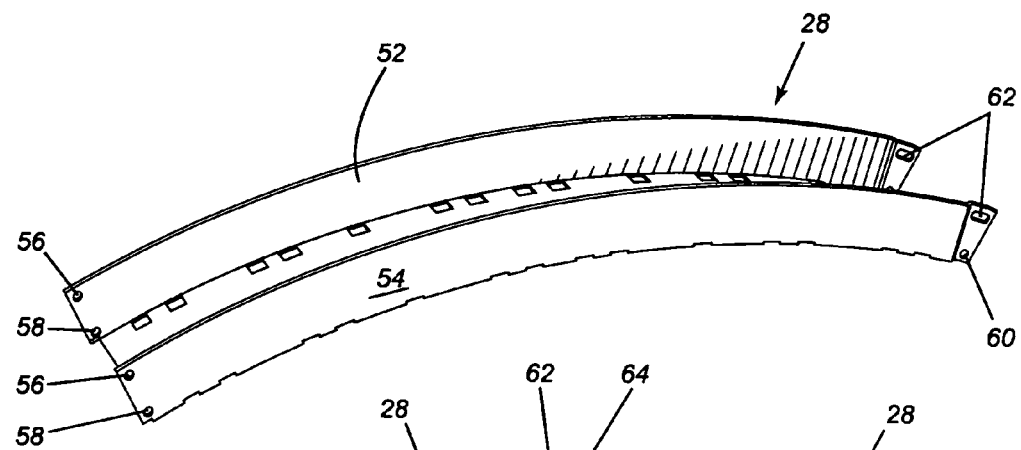
FIG. 4 is a perspective view of one of the ring segments forming the ring for the rotary plant growing apparatus.
Figure 5:
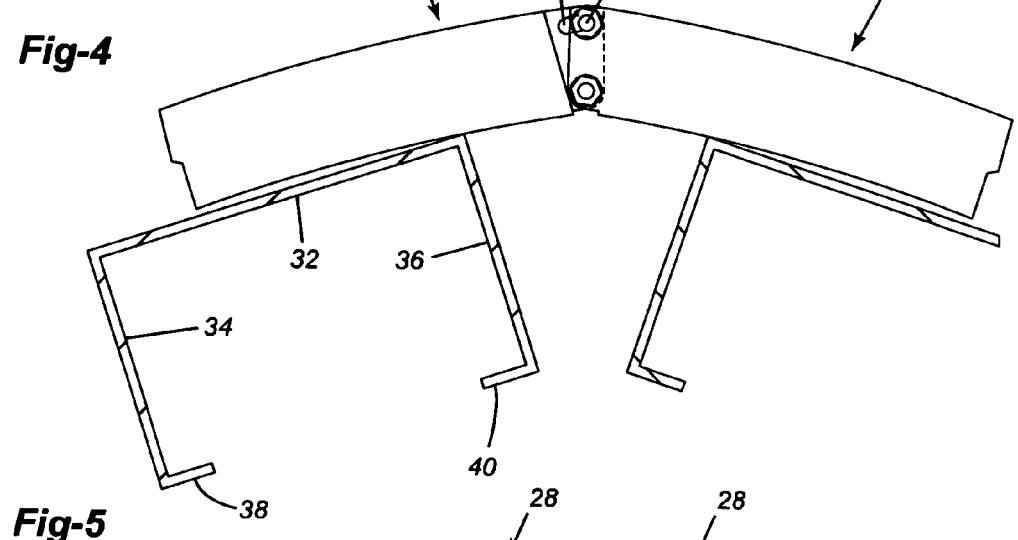
FIG. 5 is an end elevational view showing the attachment of two ring segments.
Figure 6:
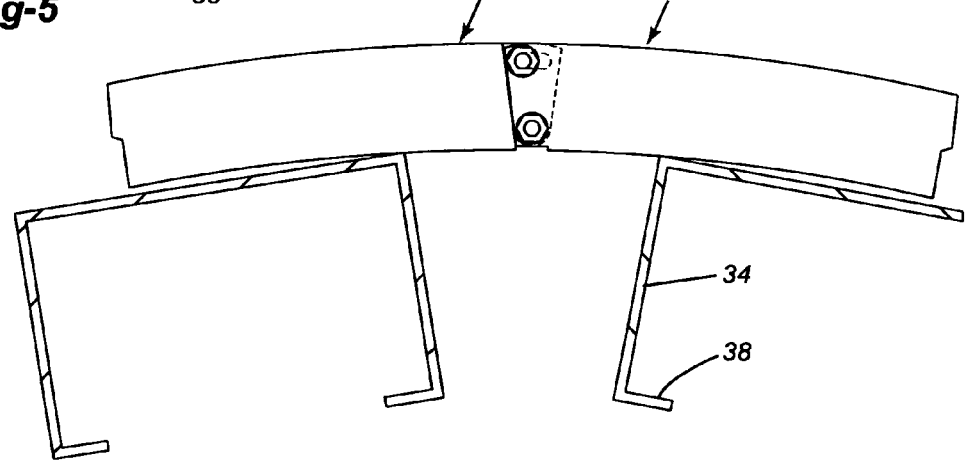
FIG. 6 is a view similar to FIG. 5 showing the embodiment of FIG. 2.

As may be seen in FIGS. 4, 5 and 6, each ring segment 28 has a bottom wall 50 and a pair of upwardly extending side walls 52 and 54. In a greater detail, side walls 52 and 54 include, at one end thereof, a pair of apertures 56 and 58 while at the other end, there is provided a bottom aperture 60 and against the upper portion thereof a slot 62. Apertures 56, 58 and 60 and slot 62 are utilised to connect adjacent ring segments 28 by means of nut and bolt generally designated by reference numeral 64. As is illustrated in FIGS. 5 and 6, the provision of a slot 62 permits adjustment of the attachment of the ring segments 28 for reasons which will be discussed hereinbelow.

Figure 2:
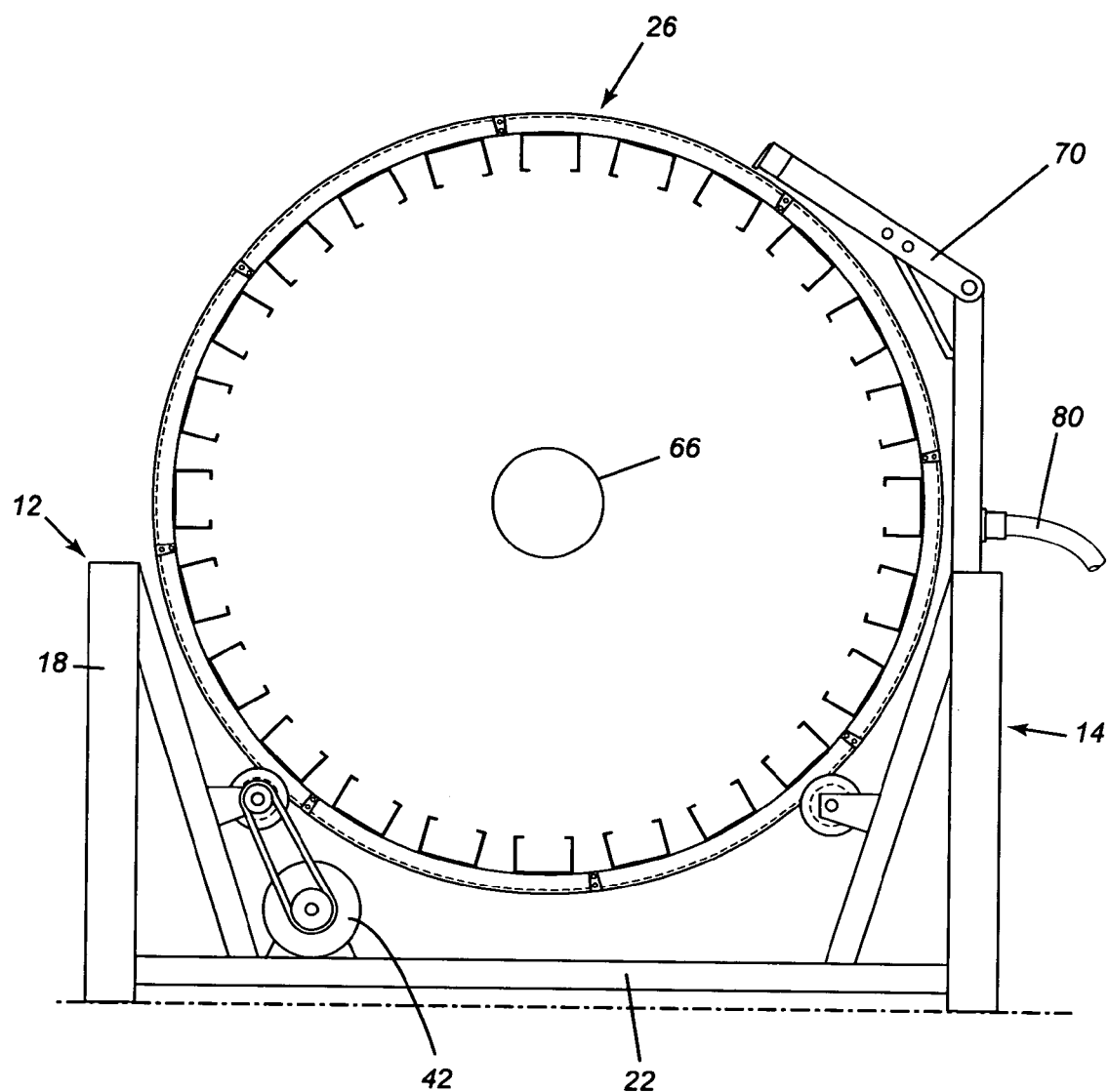
FIG. 2 is an end elevational view thereof.

As illustrated in FIG. 2, there is provided a light source 66 interiorly of rotating assembly 26. For purposes of clarity, the mounting arrangement for light source 66 is not shown though it will be understood that many different types of mounting arrangements may be provided. It will also be understood that light source 66 may be of any design: many such light means specially designed for growing plants are commercially available.

As previously discussed, the light intensity received by the plant from light source 66 varies exponentially with the distance between the plants and light source. When the plants are first commencing their growth, the apparatus of the present invention permits the removal of one or more ring segments 28 such that the diameter of the ring may be made smaller and hence the distance between the medium retaining members 30 and the light source 66 can be varied. Thus, as shown is FIG. 3, when the plants are initially commencing their growth, six such segments 28 may be used while when the plants are at a more mature stage, eight such ring segments 26 may be utilised as shown in FIG. 2. To accomplish the above, the first frame segment 12 and second frame segment 14 may be moved further apart. Each medium retaining member 30 is releasably secured to a ring segment 26.

Figure 3:
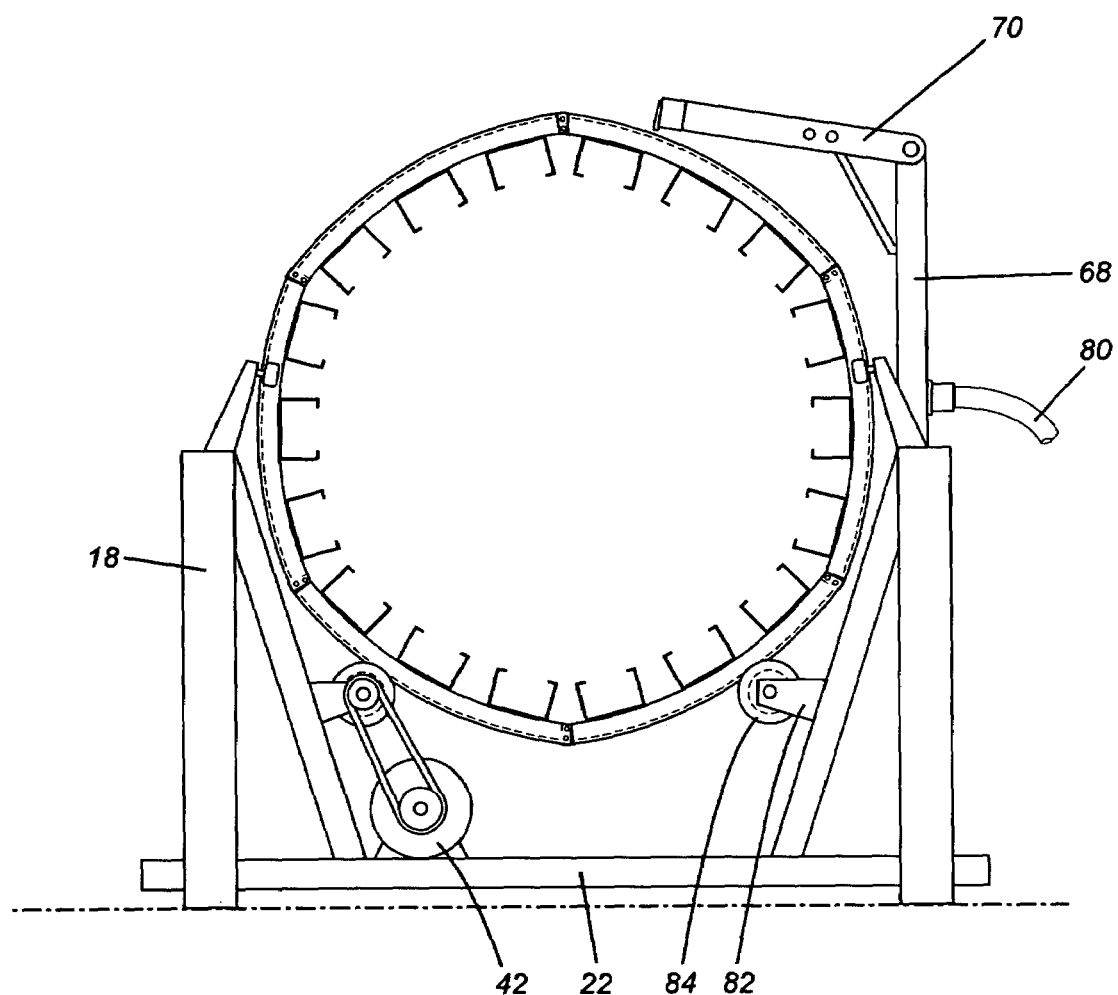
FIG. 3 is an end elevational view of a further embodiment of the present invention.

As may be seen in FIGS. 1 to 3, mounted on second frame assembly 14 is an upwardly extending post 68 for supporting an arm 70. A reinforcing member 72 interconnects post 68 and arm 70 and as may be seen in FIG. 1, a plurality of apertures 74 are provided in post 68 such that the position of arm 70 may be varied according to the size of the rotating assembly 26. Extending transversely from one end of arm 70 is a distribution member 76 having a plurality of feeding injectors 78. A hose 80 is connected to a supply of water and may be utilised to supply nutrients. The water is fed through distribution member 76 to feeding elements 78 which are arranged in alignment with slots 41 formed in base 32 of the medium retaining members 30. Thus, water and/or nutrients may be fed to the non-soil medium in the medium retaining member 30 for a desired length of time. The feeding of small amounts to the medium obviates the problem of dripping and the like. Also, the precise amount can be controlled by varying the amount of time each feeding element 78 is operative.

In order to support the rotating ring assembly 26, there may be provided a bracket 82 on which there is mounted a rotatable ring support 84.

Figure 7:
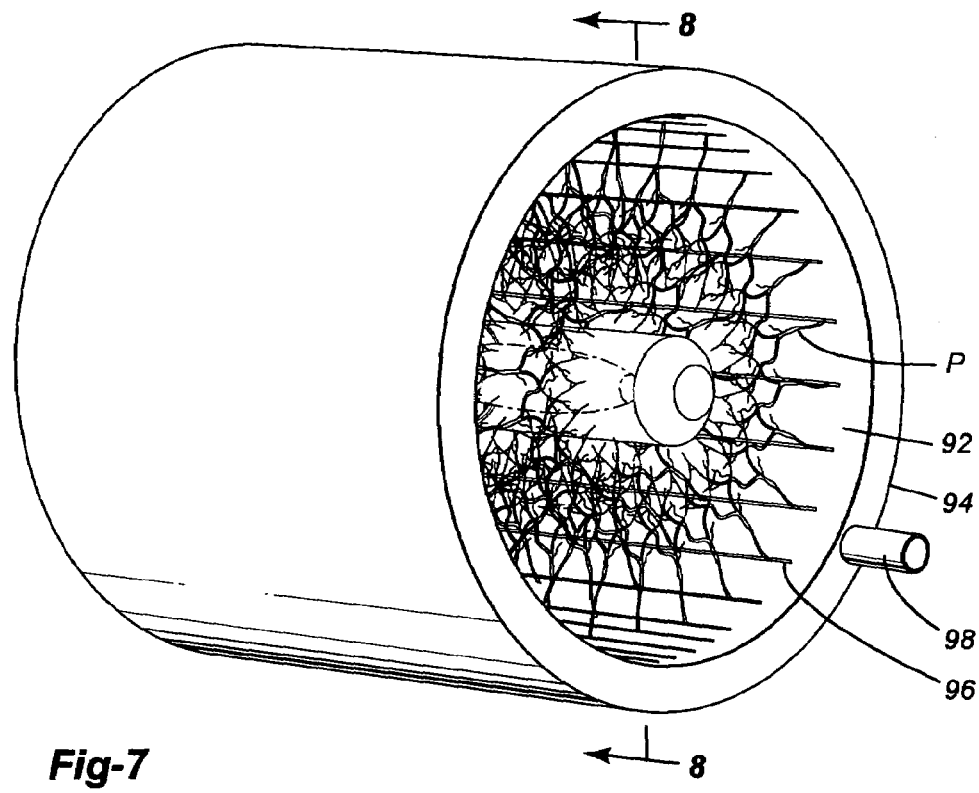
FIG. 7 is a perspective view of a portion of a further embodiment of a rotary plant growing apparatus according to the present invention.
Figure 8:
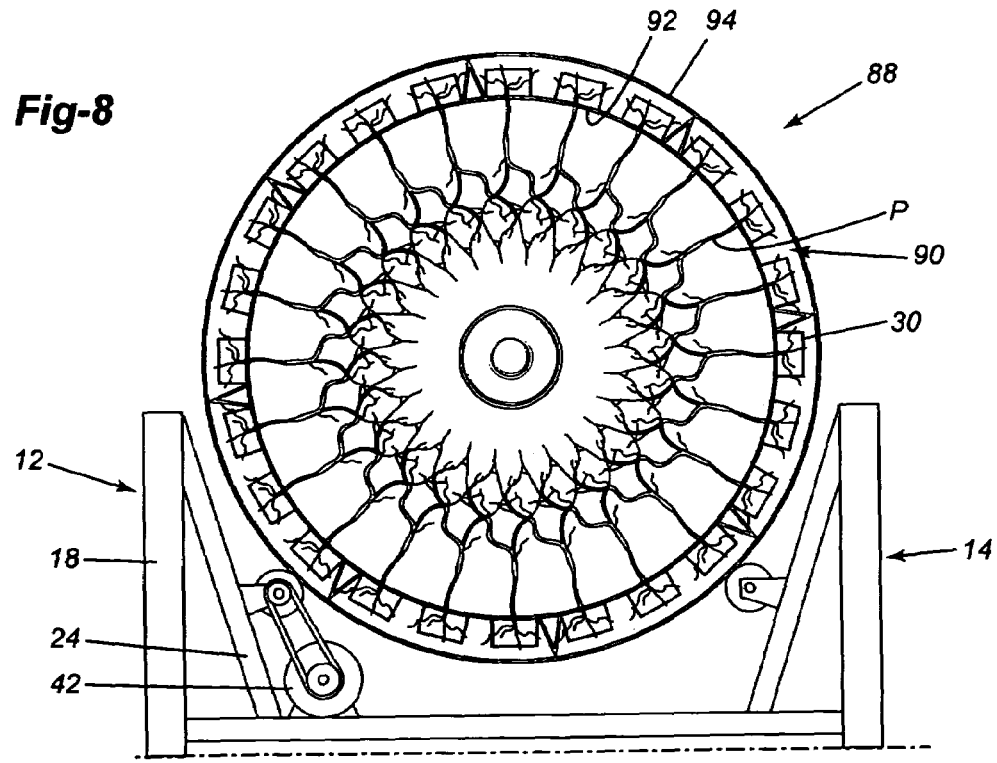
FIG. 8 is an end elevational view thereof.

A further embodiment of the invention is illustrated in FIGS. 7 and 8 and reference will now be made thereto. Similar reference numerals have been utilized for similar components and thus, there are provided a first frame assembly 12 and a second frame assembly 14 for supporting a rotating ring assembly designated by reference numeral 88. Rotating ring assembly 88 has an inner wall 92 and an outer circumferential wall 94. Provided within inner wall 94 are a plurality of longitudinally extending slots 96. Walls 92 and 94 define therebetween a space 90 wherein there are provided a plurality of medium retaining members 30. However, in this embodiment, the plants P grow through slots 96. Space 90 is provided with an input port 98 for providing water and nutrients and to this end, it is preferred that an ultra sonic fog generator be utilized to produce droplets to be fed through input port 98. In this regard, it will be understood that input port 98 may be connected periodically to ultra sonic fog generator or alternatively, port 98 may remain stationary with respect to the rotating drum. It is within the skill of those knowledgeable in the art to provide many such arrangements.

In the embodiment of FIGS. 9 and 10, a plurality of individual holders are utilized, each holder being adapted to contain a single plant P. Each holder 100 comprises a base portion 102 and an upper portion 104 having an aperture 106 therein. Each holder 100 has a slot 108 formed therein such that the holder 100 may be compressed and retained by friction.

Figures 12, 13, 14:
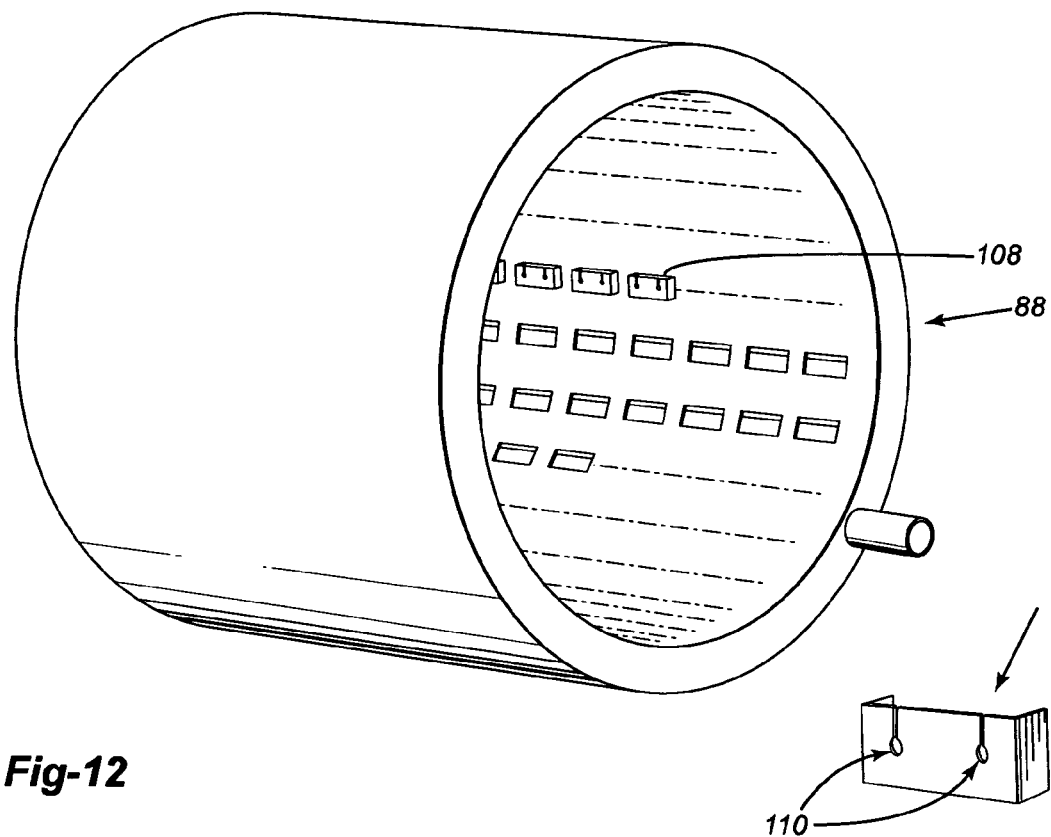
FIG. 12 is a perspective view of a different form of a drum for the embodiment of FIG. 7.
FIG. 13 is an end elevational view thereof.
FIG. 14 is a perspective view of a plant retaining member of the embodiment of FIG. 12.
Figure 15:
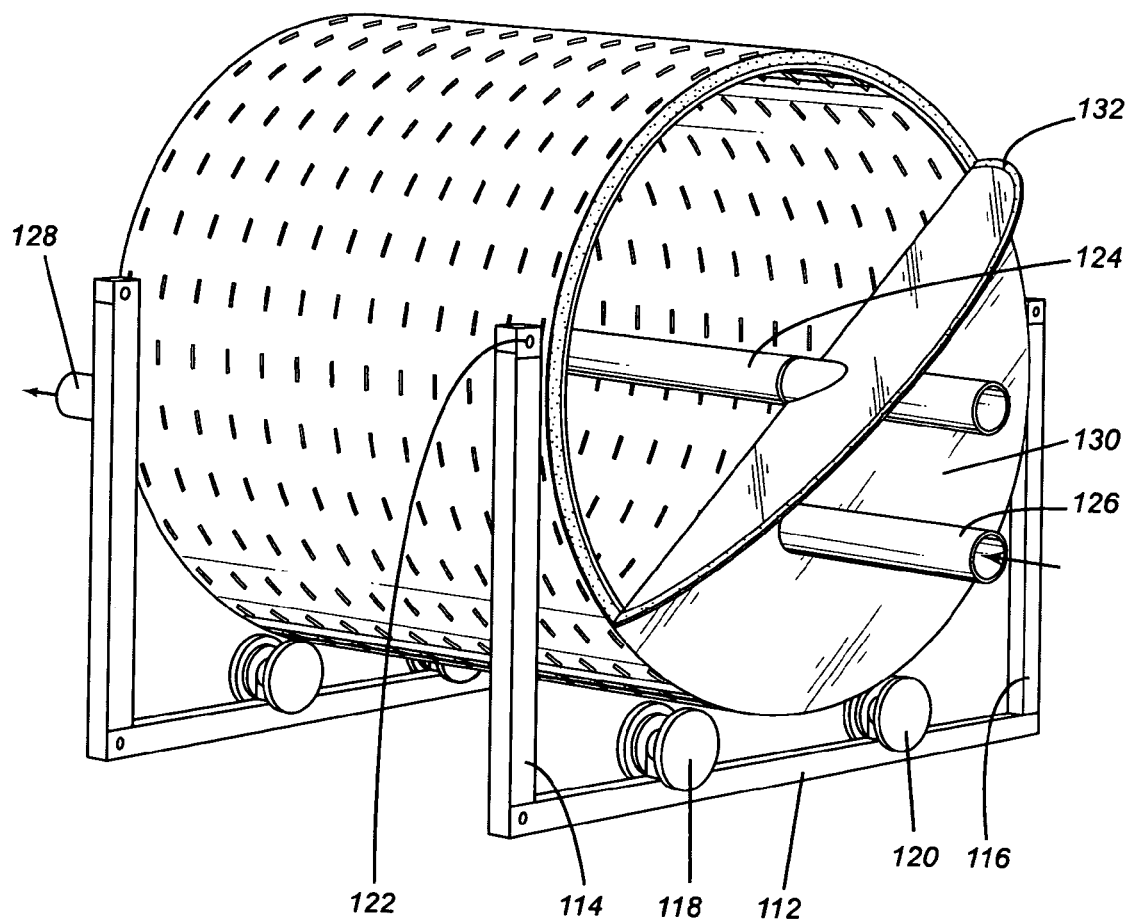
FIG. 15 is a perspective view of a still further embodiment of a plant growing apparatus according to the present invention.

In the embodiment FIGS. 12 and 13, a different type of holder 108 is utilized. Holder 108 has a pair of apertures 110 formed therein.

A still further embodiment of the present invention is illustrated in FIG. 14. In this embodiment, there is provided an adjustable base 112 having a pair of uprights 114 and 116 extending upwardly from the ends of base 112. It will be understood that base 112 may be adjustable in length.

Located on base 112 are located a pair of roller supports 118 and 120 while supports 122 are provided at the upper end of uprights 114, 116. Only one end has been described; the other end has a similar support structure. Mounted interiorly of the assembly is a light source 124. There is also provided an inlet port 126 for feeding water and nutrients and for desired gases therein while there is also provided an outlet port 128 which may include filters. An end cover 130 having a reflective surface 132 is designed to be attached to the end of the rotating ring. Naturally, it will be understood that drive means as previously described may be employed in this embodiment.

It will be understood that the above described embodiments are purposes for illustraation only and changes and modifications may be made thereto without departing from the spirit and scope of the invention.

I claim:

1. A rotary growing apparatus comprising:
   at least one ring;
   support means for said at least one ring;
   means for rotatably driving said at least one ring above the rotational axis of said at least one ring;
   a plurality of medium retaining members extending transversely of said at least one ring;
   each of said plurality of medium retaining members being secured to said at least one ring;
   at least one light source interiorly of said at least one ring; and
   said at least one ring being comprised of a plurality of ring segments each having first and second ends, each of said ring segments having attachment means at each of said first and second ends for securement to an adjacent ring segment, each ring segment being secured to an adjacent ring segment by means of a mechanical fastener extending through apertures located in said ring segment, one of said apertures being a slot to permit an adjustable angle between adjacent ring segments, the arrangement being such that different size rings may be assembled from said ring segments.

2. The rotary growing apparatus of claim 1 further including a second ring, said second ring being comprised of a plurality of second ring segments, each second ring segment being secured to an adjacent ring segment by means of a mechanical fastener extending through apertures located in said second ring segment, one of said apertures being a slot to permit an adjustable angle between adjacent second ring segments.

3. The rotary growing apparatus of claim 2 wherein each of said plurality of medium retaining members has a base and at least one side wall to define a medium receiving space, and further including liquid feeding supply means for feeding a liquid to said medium receiving spaces while said rings are rotated.

4. A rotary growing apparatus comprising:
   a single ring;
   a support means for said single ring;
   means for rotatably driving said single ring about a rotational axis of said ring, said rotational axis being substantially horizontal;
   a plurality of medium retaining members extending transversely of said ring, each of said plurality of medium retaining members having a base and at least one side wall to define a medium receiving space, each of said plurality of medium retaining members having said base secured to said single ring whereby said ring is centrally located with respect to said purality of medium retaining members with said plurality of medium retaining members extending beyond said ring on both sides thereof;
   liquid feeding means for feeding a liquid to at least one of said plurality of medium receiving space while said ring rotates about said rotational axis; and
   at least one light source interiorly of said ring.

5. The rotary growing apparatus of claim 4 wherein said at least one light source is located along said rotational axis.

6. The rotary growing apparatus of claim 4 wherein each of said plurality of medium retaining members is removably secured to said single ring by clip means.

7. The rotary growing apparatus of claim 5 wherein each of said plurality of medium retaining members has a plurality of apertures formed in said base to permit the injection of a liquidto said medium retaining space.

8. The rotary growing apparatus of claim 4 wherein said means for rotatably driving said single ring comprises a drive wheel located to drive said single ring, a drive motor having a rotating shaft, and a drive belt interconnecting said drive shaft and said drive wheel.

9. A rotary growing apparatus comprising:
   at least one ring, a support means for said at least one ring;
   means for rotatably driving said at least one ring about a rotational axis of said ring, said rotational axis being substantially horizontal;
   a plurality of medium retaining members extending transversely of said ring, each of said plurality of medium retaining members having a base and at least one side wall to define a medium receiving space, each of said plurality of medium retaining members having said base thereof secured to said ring, whereby said ring is centrally located with respect to said plurality of beyond said ring on both sides thereof said base having at least one aperture therein;
   stationary liquid supply means for supplying liquid to said medium retaining members, said liquid supply means being mounted in on upper quadrant of said ring, said liquid supply means supply liquid through said aperture in said base; and
   at least one light source interiorly of said ring.

10. The rotary growing apparatus of claim 9 wherein said at least one light source is located centrally of said at least one ring.

11. The rotary growing apparatus of claim 9 wherein each of said bases of each of said plurality of medium retaining members has a plurality of apertures formed therein.

* * * * *